(12) United States Patent
French et al.

(10) Patent No.: US 11,760,047 B2
(45) Date of Patent: Sep. 19, 2023

(54) ADHESIVE FOR PC-MOF APPLICATION

(71) Applicant: Essilor International, Charenton-le-Pont (FR)

(72) Inventors: Elliot French, Dallas, TX (US); Peiqi Jiang, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 306 days.

(21) Appl. No.: 17/054,813

(22) PCT Filed: May 13, 2019

(86) PCT No.: PCT/EP2019/062243
§ 371 (c)(1),
(2) Date: Nov. 12, 2020

(87) PCT Pub. No.: WO2019/219627
PCT Pub. Date: Nov. 21, 2019

(65) Prior Publication Data
US 2021/0221079 A1 Jul. 22, 2021

(30) Foreign Application Priority Data
May 15, 2018 (EP) .................................... 18305599

(51) Int. Cl.
*B29D 11/00* (2006.01)
*G02B 1/04* (2006.01)
(Continued)

(52) U.S. Cl.
CPC .... *B29D 11/0073* (2013.01); *B29D 11/00009* (2013.01); *G02B 1/041* (2013.01); *B29K 2669/00* (2013.01); *B29K 2701/12* (2013.01)

(58) Field of Classification Search
CPC .......... B29D 11/0073; B29D 11/00009; G02B 1/041
See application file for complete search history.

(56) References Cited

U.S. PATENT DOCUMENTS 5,800,744 A 9/1998 Munakata
7,036,932 B2 5/2006 Boulineau et al.
(Continued)

FOREIGN PATENT DOCUMENTS

CN 101080657 A 11/2007
CN 101592796 A 12/2009
(Continued)

OTHER PUBLICATIONS

Office Action issued in the CN Patent Application No. 201980031166.0 dated Nov. 23, 2021, English Translation provided.
(Continued)

*Primary Examiner* — Mathieu D Vargot
(74) *Attorney, Agent, or Firm* — NIXON & VANDERHYE

(57) ABSTRACT

Disclosed are methods (100) for preparing a laminate incorporable to a surface of an optical lens and methods (500) for incorporating the laminate on the surface of the optical lens. The laminate is prepared by laminating an optical film (202a, 202b), such as a polycarbonate film, on each side of a functional film using an adhesive that is capable of preventing optical defects in the laminates during a thermoforming process and an injection molding process. The adhesive has optimal thermomechanical properties that include that the optical film (202a, 202b) coated with said adhesive has a modulus by compression greater than $6 \times 10^6$ Pa, and preferably greater than $2 \times 10^8$ Pa at a temperature from about 130° C. to 150° C. The laminate is incorporated on the optical lens via thermoforming followed by injection molding with overmolding technology.

16 Claims, 5 Drawing Sheets

100

Provide a functional film comprising a front surface and a back surface
101

Laminate a thermoplastic film on each of the front surface and back surface of the functional film using an adhesive to form the laminate
102

(51) Int. Cl.
*B29K 669/00* (2006.01)
*B29K 701/12* (2006.01)

(56) References Cited

U.S. PATENT DOCUMENTS

| | | |
|---|---|---|
| 2003/0184863 A1 | 10/2003 | Nakagoshi |
| 2004/0214978 A1 | 10/2004 | Rosin et al. |
| 2006/0182972 A1 | 8/2006 | Bhalakia et al. |
| 2009/0252897 A1 | 10/2009 | Matsuo et al. |
| 2016/0108298 A1 | 4/2016 | Berzon et al. |
| 2016/0185055 A1 | 6/2016 | Guadagnin |
| 2017/0102558 A1 | 4/2017 | Saylor et al. |
| 2017/0205639 A1 | 7/2017 | Mccabe et al. |

FOREIGN PATENT DOCUMENTS

| | | | |
|---|---|---|---|
| CN | 105073814 A | | 11/2015 |
| EP | 1391493 | * | 2/2004 |
| EP | 1 560 060 | | 8/2005 |
| EP | 2 119 554 | | 11/2009 |
| JP | 2007-293030 | * | 11/2007 |
| JP | 2013-40244 | * | 2/2013 |

OTHER PUBLICATIONS

International Search Report and Written Opinion of the ISA for PCT/EP2019/062243 dated Jul. 31, 2019, 22 pages.

* cited by examiner

100
Provide a functional film comprising a front surface and a back surface
101
Laminate a thermoplastic film on each of the front surface and back surface of the functional film using an adhesive to form the laminate
102
FIG. 1
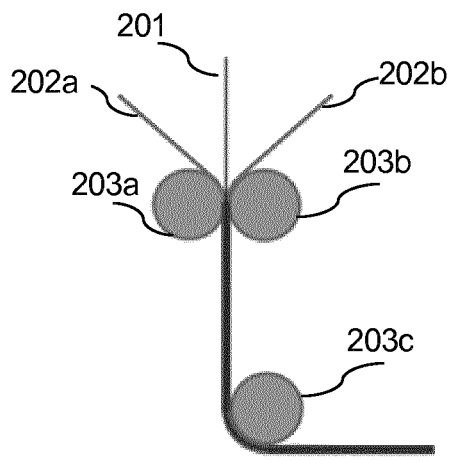
FIG. 2
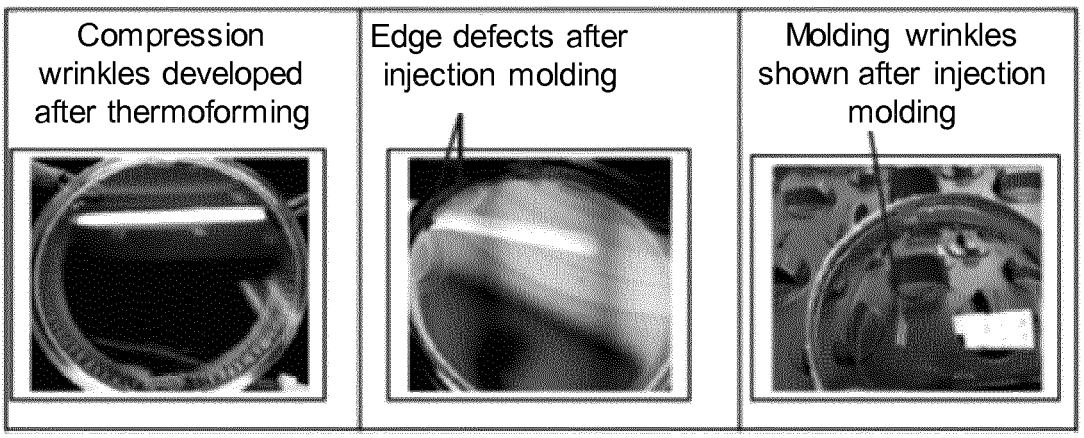
| Compression wrinkles developed after thermoforming | Edge defects after injection molding | Molding wrinkles shown after injection molding |
FIG. 3A      FIG. 3B      FIG. 3C

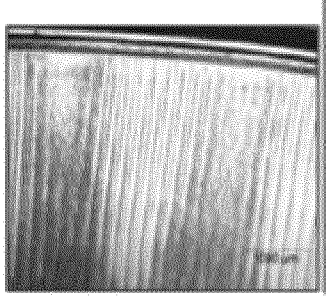 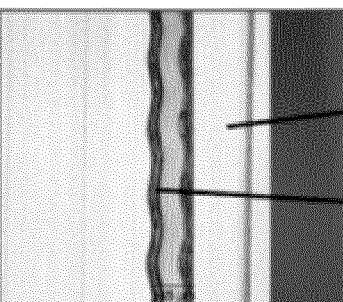
Normal to surface    Cross-sectional view
FIG. 4A    FIG. 4B
Convex side (no wrinkle)
Concave side (wrinkle)
 
Normal to surface    Cross-sectional view
FIG. 4C    FIG. 4D
Adhesive residue squeezed from the edge
Uneven MOF surface and void gaps
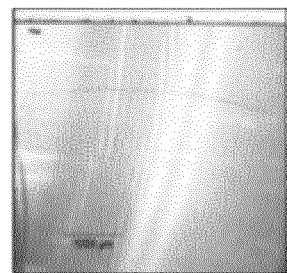 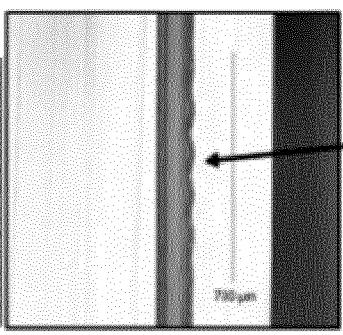
Normal to surface    Cross-sectional view
FIG. 4E    FIG. 4F
Wrinkles on convex side of the laminate Close mold → Inject clear molten PC; fuse-bond to laminate → Eject lens DMA Apparatus

ADHESIVE FOR PC-MOF APPLICATION

This application is the U.S. national phase of International Application No. PCT/EP2019/062243 filed May 13, 2019 which designated the U.S. and claims priority to EP Patent Application No. 18305599.5 filed May 15, 2018, the entire contents of each of which are hereby incorporated by reference.

FIELD OF INVENTION

The present invention concerns a method of making a polymeric laminate that can be incorporated on an optical lens. More specifically, the present invention concerns a method of making a polymeric laminate that is capable of substantially preventing formation of optical defects when incorporating the laminate on a surface of an optical lens.

BACKGROUND OF THE INVENTION

A functional film, such as a multi-layered optical film (MOF), is used to add protection or various optical properties to an optical lens. Generally, a polycarbonate film is laminated on each side of the functional film to form a polymeric laminate due to its soft texture. The polymeric laminate is subsequently thermoformed to produce a curved surface that conforms to the optical lens. The thermoformed polymeric laminate is then fuse-bonded on the lens via injection molding.

During thermoforming, high compressive force is imparted on the concave side of the laminate at an elevated temperature to conform the laminate to a curved surface. In injection molding of the optical lens, molten polycarbonate is compressed against the concave surface of the laminate at a high temperature to form a dense polycarbonate lens with the laminate incorporated on the surface. Often UV curable adhesives or pressure sensitive adhesives used for bonding the polycarbonate film and the functional film fail to retain the integrity under the high pressure and high temperature conditions, resulting in unwanted deformation of the functional film and/or unwanted deformation and/or delamination of the adhesive layer in the polymeric laminate. This can cause various defects in the polymeric laminate including compression wrinkles and irregular spots. Therefore, the conventional method of preparing polymeric laminate and incorporating the laminate on an optical lens can result in a high defects rate for the lens products.

Overall, while methods exist for preparing a functional film-containing a laminate and incorporating the laminate on the surface of an optical lens, the need for improvements in this field persists in light of at least the aforementioned drawback with the conventional methods.

SUMMARY OF THE INVENTION

A solution to the above-mentioned problem associated with preparing a functional film-containing laminate and incorporating the laminate on the surface of an optical lens has been discovered. The solution resides in a method of preparing the laminate using an adhesive adapted to avoid unwanted deformation and delamination during a thermoforming and/or injection molding process. By way of example, the adhesive used in the polymeric laminate of the present invention can be designed to have optimal thermo-mechanical properties including a high modulus under the operating conditions of thermoforming and injection molding such that the adhesive during these processes is not squeezed out of the laminate edge or delaminated to disrupt the shape of the functional film. Modulus is a mechanical property that measures the stiffness of a solid material. It is defined as the ratio of the stress applied to a material along the longitudinal axis of the specimen tested and the deformation or strain, measured on that same axis. It is also known as the maximum stress/maximum strain. Thus, the adhesive of the present invention is capable of substantially preventing the formation of optical defects on the polymeric laminate when it is incorporated on the surface of the optical lens. Therefore, laminates prepared by the methods of the present invention provide a technical achievement over at least some of the problems associated with the currently available adhesives and methods of incorporating functional films on optical lenses.

Some embodiments of the invention are directed to a method of preparing a laminate that is incorporable on a surface of an optical lens. In some aspects, the method may comprise providing a functional film comprising a front surface and a back surface. The method may include laminating an optical film on each of the front surface and the back surface of the functional film using an adhesive to form the laminate. At a temperature from 130° C. to 150° C., the adhesive coated optical film sample should have a modulus greater than $6 \times 10^6$ Pa at strains up to 100%, and still more preferably greater than $2 \times 10^8$ Pa at temperatures between 130° C. to 150° C. Non-limiting examples of the functional film may include a multi-layered optical film, a polarized film, a photochromic film, and combinations thereof. In some aspects, the multi-layered optical film may comprise a high refractive index material and a low refractive index material. Non-limiting examples of the high refractive index material may include polycarbonate, polyester, polystyrene, polystyrene maleic anhydride, aromatic polyamide, aromatic thermoplastic urethane, polysulfone, polyphenyl oxide or combinations thereof. Non-limiting examples of the low refractive index material may include polymethyl methacrylate, aliphatic polyamide, aliphatic thermoplastic urethane, cyclic olefin, or combinations thereof. In some aspects, the optical film may comprise polycarbonate, cellulose triacetate, poly methyl methacrylate, polystyrene, polystyrene maleic anhydride, polyamide, thermoplastic urethane, polyester, copolyesters, polysulfone, cyclic olefin, polyphenyl oxide, or combinations thereof.

In embodiments of the invention, the adhesive used in the method of preparing the laminate is capable of substantially avoiding unwanted deformation and/or delamination of the adhesive and/or unwanted deformation of the functional film during a thermoforming and/or injection-molding process. In some instances, the unwanted deformation and/or delamination of the adhesive, and/or the unwanted deformation of the functional film can cause optical defects on a surface of the optical lens when the laminate is incorporated on the surface of the optical lens. In some aspects of the present invention, the adhesive can comprise a polyurethane adhesive, an epoxy adhesive, a hot-melt adhesive, a hot-melt polyurethane reactive adhesive, a crosslinked acrylic adhesive, or combinations thereof. The polyurethane adhesive can comprise polycaprolactone and polyisocyanate. A mass ratio of polycaprolactone to polyisocyanate may be in a range of 0.1 to 1.0. In some aspects, the adhesive between the polycarbonate film and the functional film has a thickness of 0.5 to 20 μm. In some aspects, the adhesive is a water-based or a solvent-based adhesive, preferably a water-based adhesive.

In some aspects of the present invention, non-limiting examples of thermoforming can include free-edge vacuum thermoforming, vacuum with plug assist thermoforming, mold press thermoforming, blow thermoforming, and combinations thereof. In some instances, the thermoforming is carried out at a temperature of 100 to 150° C. and a pressure of −8 to 0.8 bar. The injection molding can be carried out at a temperature of 200 to 320° C. and a pressure of 50 to 1500 bar. In some aspects, the optical lens may comprise polycarbonate, poly methyl methacrylate, polystyrene, polystyrene maleic anhydride, polyamide, thermoplastic urethane, polyester, copolyesters, polysulfone, cyclic olefin, polyphenyl oxide, or combinations thereof.

Some embodiments of the invention are directed to a laminate incorporable on a surface of an optical lens. The laminate may comprise a functional film comprising a front surface and a back surface. The laminate may comprise an optical film laminated on each of the front surface and the back surface of the functional film via an adhesive. The adhesive may be capable of substantially preventing unwanted deformation of the functional film and/or unwanted deformation and/or delamination of the adhesive layer during a thermoforming and/or injection-molding process. In some embodiments, the functional film may include a multi-layered optical film, a polarized film, a photochromic film, or combinations thereof. The optical film can comprises polycarbonate, cellulose triacetate, poly methyl methacrylate, polystyrene, polystyrene maleic anhydride, polyamide, thermoplastic urethane, polyester, copolyesters, polysulfone, cyclic olefin, polyphenyl oxide, or combinations thereof. In some aspects, the adhesive coated film can have a modulus greater than $6\times10^6$ Pa at strains less than 100% and more preferably a modulus by compression greater than $2\times10^8$ Pa at a temperature of 130 to 150° C. In the present application, the terms "modulus" and "modulus by compression" are used in an undifferentiated manner to refer to the ratio of the stress applied to a material along the longitudinal axis of the specimen tested and the deformation or strain, measured on that same axis.

Some embodiments of the invention are directed to a method of incorporating a functional film on a surface of an optical lens. The method can comprise preparing a laminate according to the method described above. The method can comprise thermoforming the laminate according to an inner surface of a mold for the optical lens. The method can further comprise molding the optical lens with the thermoformed laminated conformed to the inner surface of the mold via injection molding to produce the optical lens with the laminate formed on the surface thereof. In some aspects of the present invention, the laminate can be adapted to substantially avoid optical defects on the surface of the optical lens caused by unwanted deformation or delamination of the adhesive and/or the functional film during the thermoforming and/or injection molding process.

The following includes definitions of various terms and phrases used throughout this specification.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %," "vol. %," or "mol. %" refers to a weight, volume, or molar percentage of a component, respectively, based on the total weight, the total volume, or the total moles of material that includes the component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, includes any measurable decrease or complete inhibition to achieve a desired result.

The term "effective," as that term is used in the specification and/or claims, means adequate to accomplish a desired, expected, or intended result.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

DESCRIPTION OF THE DRAWINGS

For a more complete understanding, reference is now made to the following descriptions taken in conjunction with the accompanying drawings, in which:

FIG. 1 shows a schematic flowchart for a method of preparing a laminate incorporable on a surface of an optical lens, according to embodiments of the invention;

FIG. 2 shows a schematic diagram of a process of preparing a laminate incorporable to a surface of an optical lens, according to embodiments of the invention;

FIGS. 3A to 3C show optical defects on a surface of an optical lens caused by unwanted deformation and/or delamination of an adhesive in a laminate incorporable to the surface of the lens;

FIGS. 4A to 4F show front views and cross-sectional views of various types of optical defects in a laminate caused by unwanted deformation of a functional film and/or unwanted deformation and delamination of an adhesive in the laminate;

DETAILED DESCRIPTION OF THE INVENTION

Figure 5:
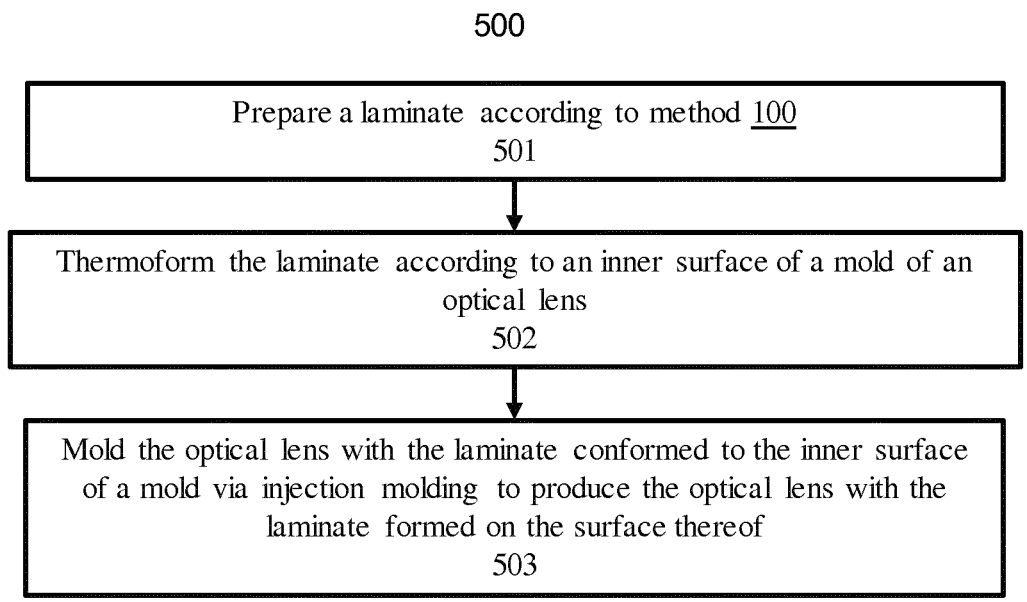
FIG. 5 shows a schematic flowchart of a method of incorporating a functional film on a surface of an optical lens, according to embodiments of the invention.

The currently available methods and/or systems for making a laminate incorporable on a surface of an optical lens suffer the deficiency of being prone to optical defects on the surface thereof when the laminate is thermoformed and/or formed on a surface of an optical lens via injection molding. The present invention provides a solution to this problem. The solution is premised on a method of preparing a laminate incorporable on a surface of an optical lens using an adhesive that has optimal thermomechanical properties to avoid unwanted deformation and delamination of the adhesive layers and/or unwanted deformation of the functional film in the laminate during the thermoforming and/or injection molding processes. Therefore, the adhesive is capable of preventing the formation of optical defects caused by unwanted deformation and delamination of the adhesive layers and/or the disruption of the functional film.

These and other non-limiting aspects of the present invention are discussed in further detail in the following sections.

A. Method for Preparing a Laminate Incorporable on a Surface of an Optical Lens

Functional films, such as multi-layered optical films, polarized films, and photochromic films, are used to incorporate additional optical properties to an optical lens. Due to the soft texture of the functional films, an optical film, such as a polycarbonate film, is often laminated to each side of the functional film to form a laminate. The laminate then can be incorporated on the surface of an optical lens.

Conventionally, the laminate comprising a functional film is prepared by using a pressure sensitive adhesive or an acrylic UV curable adhesive. During a thermoforming and/or an injection molding process, the high pressure and high temperature applied on the surface(s) of the laminate can cause delamination or unwanted deformation of the adhesive, resulting in unwanted deformation of the functional film and optical defects in the laminate.

The method of the present invention can produce a laminate that is capable of preventing the unwanted deformation and delamination of the adhesive layers and/or the disruption of the functional film during a thermoforming process and/or an injection molding process. As shown in FIG. 1, embodiments of the present invention include method 100 of preparing a laminate that is incorporable to a surface of an optical lens. In embodiments of the invention, the optical lens may include polycarbonate, poly methyl methacrylate, polystyrene, polystyrene maleic anhydride, polyamide, thermoplastic urethane, polyester, copolyesters, polysulfone, cyclic olefin, polyphenyl oxide, or combinations thereof.

In embodiments of the invention, as shown in block 101, method 100 may comprise providing a functional film comprising a front surface and a back surface. In some aspects, non-limiting examples for the functional film may include a multi-layered optical film, a polarized film, a photochromic film, or combinations thereof. In certain aspects, the multi-layered optical film may include a high refractive index material and a low refractive index material. In some instances, non-limiting examples of the high refractive index material can include polycarbonate, polyester, polystyrene, polystyrene maleic anhydride, aromatic polyamide, aromatic thermoplastic urethane, polysulfone, polyphenyl oxide or combinations thereof. Non-limiting examples for the low refractive index material can include polymethyl methacrylate, aliphatic polyamide, aliphatic thermoplastic urethane, cyclic olefin, or combinations thereof.

In embodiments of the invention, method 100 may further include laminating an optical film on each of the front surface and the back surface of the functional film using an adhesive to form the laminate, as shown in block 102. The optical film can include any optical film suitable for lenses. In some aspects, the optical film can comprise polycarbonate, cellulose triacetate, poly methyl methacrylate, polystyrene, polystyrene maleic anhydride, polyamide, thermoplastic urethane, polyester, copolyesters, polysulfone, cyclic olefin, polyphenyl oxide, or combinations thereof. The laminating may include a wet bond lamination process, or a dry bond lamination process. A schematic diagram for a wet bond lamination process is shown in FIG. 2. In wet bond lamination, the adhesive may be dispensed on each side of functional film 201. Polycarbonate (PC) layers (202a and 202b) can be laminated on both sides of functional film 201 by rollers 203a-203c. In some aspects, the laminating may have a laminating temperature in a range of 15 to 320° C. and all ranges and values there between including ranges of 15 to 30° C., 30 to 45° C., 45 to 60° C., 60 to 75° C., 75 to 90° C., 90 to 105° C., 105 to 120° C., 120 to 135° C., 135 to 150° C., 150 to 165° C., 165 to 180° C., 180 to 195° C., 195 to 210° C., 210 to 225° C., 225 to 240° C., 240 to 255° C., 255 to 270° C., 270 to 285° C., 285 to 300° C., and 300 to 320° C. A laminating pressure may be in a range of 0.3 to 10 bar and all ranges and values there between including ranges of 0.3 to 0.4 bar, 0.4 to 0.5 bar, 0.5 to 0.6 bar, 0.6 to 0.7 bar, 0.7 to 0.8 bar, 0.8 to 0.9 bar, 0.9 to 1.0 bar, 1.0 to 2.0 bar, 2.0 to 3.0 bar, 3.0 to 4.0 bar, 4.0 to 5.0 bar, 5.0 to 6.0 bar, 6.0 to 7.0 bar, 7.0 to 8.0 bar, 8.0 to 9.0 bar, 9.0 to 10.0 bar. In some aspects, in the dry bond lamination process, the adhesive may be deposited on the optical film (e.g., polycarbonate film) or the functional film (e.g., multi-layered optical film) first. After the adhesive is dried, the optical film and the functional film may be laminated. The dry bond lamination process may be used when the adhesive contains a solvent.

In some embodiments, the adhesive is capable of preventing formation of optical defects on the laminate during a thermoforming process and/or an injection molding process. Non-limiting examples of the thermoforming may include free-edge vacuum thermoforming, vacuum with plug assist thermoforming, mold press thermoforming, blow thermoforming, and combinations thereof. In some instances, the thermoforming may be carried out at a temperature of 100 to 150° C. and all ranges and values there between including 100 to 102° C., 102 to 104° C., 104 to 106° C., 106 to 108° C., 108 to 110° C., 110 to 112° C., 112 to 114° C., 114 to 116° C., 116 to 118° C., 118 to 120° C., 120 to 122° C., 122 to 124° C., 124 to 126° C., 126 to 128° C., 128 to 130° C., 130 to 132° C., 132 to 134° C., 134 to 136° C., 136 to 138° C., 138 to 140° C., 140 to 142° C., 142 to 144° C., 144 to 146° C., 146 to 148° C., and 148 to 150° C. Thermoforming may be carried out at a pressure in a range of −8 to 0.8 bar and all ranges and values there between, including −7 bar, −6 bar, −5 bar, −4 bar, −3 bar, −2 bar, −1 bar, 0 bar, 0.1 bar, 0.2 bar, 0.3 bar, 0.4 bar, 0.5 bar, 0.6 bar, and 0.7 bar. In some aspects, the injection molding may be carried out at a temperature in a range of 200 to 320° C. and all ranges and values there between including 200 to 210° C., 210 to 220° C., 220 to 230° C., 230 to 240° C., 240 to 250° C., 250 to 260° C., 260 to 270° C., 270 to 280° C., 280 to 290° C., 290 to 300° C., 300 to 310° C., and 310 to 320° C. An operating pressure for the injection molding may be in a range of 50 to 1500 bar including ranges of 50 to 60 bar, 60 to 70 bar, 70 to 80 bar, 80 to 90 bar, 90 to 100 bar, 100 to 200 bar, 200 to 300 bar, 300 to 400 bar, 400 to 500 bar, 500 to 600 bar, 600 to 700 bar, 700 to 800 bar, 800 to 900 bar, 900 to 1000 bar, 1000 to 1100 bar, 1100 to 1200 bar, 1200 to 1300 bar, 1300 to 1400 bar, and 1400 to 1500 bar.

The optical defects that the laminate is capable of preventing may include compression wrinkles (e.g., FIG. 3A), edge defect spots (e.g., FIG. 3B), molding wrinkles (e.g., FIG. 3C). In certain aspects, the defects may have an iridescent appearance. In some aspects, the unwanted deformation of the functional film in the laminate can cause the optical defects in the laminate. Alternatively or additionally, in some aspects, the optical defects may be caused by unwanted deformation or delamination of the adhesive. As shown in FIGS. 4A and 4B, delaminated areas shown in the cross section of the laminate correspond to the compression wrinkles on the laminate. In some instances, the defects including the edge spots on the laminate may be caused by adhesive being squeezed out from the edge of the laminate during an injection molding process, as shown in FIGS. 4C and 4D. As shown in FIGS. 4E and 4F, compression force in an injection molding process may disrupt the shape of the adhesive layer and the functional film to cause optical defects thereon.

In some aspects, the adhesive used in method 100 may have optimal thermomechanical properties to prevent the adhesive from unwanted deformation or delamination during a thermoforming process and/or an injection molding process. In some aspects, the adhesive coated optical film may have a modulus greater than $6 \times 10^6$ Pa at strains up to 100% at a temperature in a range from about 130° C. to 150° C. and all ranges and values there between including 130 to 132° C., 132 to 134° C., 134 to 136° C., 136 to 138° C., 138 to 140° C., 140 to 142° C., 142 to 144° C., 144 to 146° C., 146 to 148° C., and 148 to 150° C. In some aspects, the optical film coated with the adhesive may more preferably have a modulus greater than $2 \times 10^8$ Pa at strains up to 100% at a temperature in a range of about 130° C. to 150° C. and all ranges and values there between. In some aspects, the adhesive may have a stress relaxation during tension sufficient to not cause an unwanted build-up of stress onto the optical layer and the functional layer after the thermoforming step.

In some embodiments, the adhesive can include a polyurethane adhesive, an epoxy adhesive, a hot-melt adhesive, a hot-melt polyurethane reactive adhesive, a crosslinked acrylic adhesive, or combinations thereof. The polyurethane adhesive can be a solvent free polyurethane adhesive, or solvent based polyurethane adhesive. In some aspects, the polyurethane adhesive may include a water based polyurethane adhesive that comprises polycaprolactone and polyisocyanate, or polyol and polyisocyanate, or polyurethane hot melt adhesive, or combinations thereof. In some aspects, the polyurethane adhesive may include polycaprolactone and polyisocyanate. Polycarprolactone and polyisocyanate may have a mass ratio in a range of 0.1 to 1.0 and all ranges and values there between including 0.2, 0.3, 0.4, 0.5, 0.6, 0.7, 0.8, and 0.9. In some aspects, the adhesive between the optical film (e.g., polycarbonate film) and the functional film has a thickness in a range of 0.5 to 20 μm and all ranges and values there between including ranges of 0.5 to 0.6 μm, 0.6 to 0.7 μm, 0.7 to 0.8 μm, 0.8 to 0.9 μm, 0.9 to 1.0 μm, 1.0 to 2.0 μm, 2.0 to 3.0 μm, 3.0 to 4.0 μm, 4.0 to 5.0 μm, 5.0 to 6.0 μm, 6.0 to 7.0 μm, 7.0 to 8.0 μm, 8.0 to 9.0 μm, 9.0 to 10.0 μm, 10.0 to 11.0 μm, 11.0 to 12.0 μm, 12.0 to 13.0 μm, 13.0 to 14.0 μm, 14.0 to 15.0 μm, 15.0 to 16.0 μm, 16.0 to 17.0 μm, 17.0 to 18.0 μm, 18.0 to 19.0 μm, and 19.0 to 20.0 μm.

B. Method for Incorporating a Functional Film on a Surface of an Optical Lens

As shown in FIG. 5, embodiments of the present invention include method 500 of incorporating a functional film on a surface of an optical lens. In some embodiments, the optical lens may include polycarbonate, poly methyl methacrylate, polystyrene, polystyrene maleic anhydride, polyamide, thermoplastic urethane, polyester, copolyesters, polysulfone, cyclic olefin, polyphenyl oxide, or combinations thereof.

Figure 6:
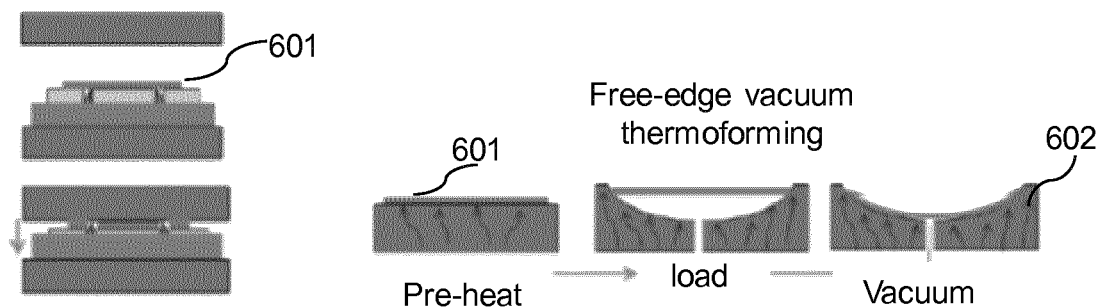
FIG. 6 shows a schematic diagram for a thermoforming process, according to embodiments of the invention.

In embodiments of the invention, as shown in block 501, method 500 may include preparing a laminate according to method 100 as described above. As shown in block 502, method 500 may further include thermoforming the laminate according to an inner surface of a mold for injection molding the optical lens. In some aspects, thermoforming may include free-edge vacuum thermoforming, vacuum with plug assist thermoforming, mold press thermoforming, blow thermoforming, or combinations thereof. In some instances, the thermoforming may be free-edge vacuum thermoforming. As shown in FIG. 6, in some aspects, free-edge vacuum thermoforming may include cutting the laminate prepared according to method 100 into circle to form a laminate wafer 601. The laminate wafer may be pre-heated to a predetermined temperature. The predetermined temperature may be in a range of 100 to 150° C. and all ranges and values there between including 100 to 102° C., 102 to 104° C., 104 to 106° C., 106 to 108° C., 108 to 110° C., 110 to 112° C., 112 to 114° C., 114 to 116° C., 116 to 118° C., 118 to 120° C., 120 to 122° C., 122 to 124° C., 124 to 126° C., 126 to 128° C., 128 to 130° C., 130 to 132° C., 132 to 134° C., 134 to 136° C., 136 to 138° C., 138 to 140° C., 140 to 142° C., 142 to 144° C., 144 to 146° C., 146 to 148° C., and 148 to 150° C. Thermoforming may further include loading pre-heated laminate wafer 601 on a vacuum forming stand 602 that comprises an inner surface with a shape substantially the same as an outer surface of an optical lens. Vacuum may be applied to the forming stand 602 to induce laminate wafer 601 to conform to the inner surface thereof, thereby forming a thermoformed laminate wafer 601. In some aspects, a vacuum pressure applied to the forming stand 602 may be in a range of −8 to −4 bar gauge and all ranges and values there between, including −7.5 bar, −7 bar, −6.5 bar, −6 bar, −5.5 bar, −5 bar, −4.5 bar, and −4 bar.

Figure 7:
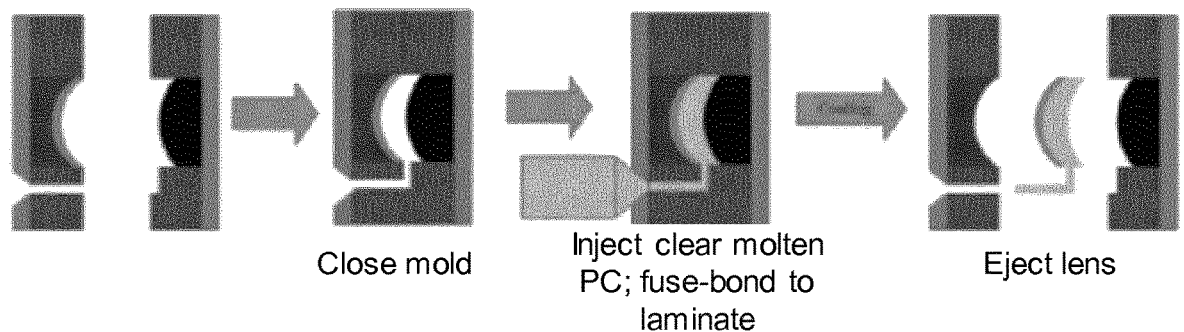
FIG. 7 shows a schematic diagram for an injection molding process, according to embodiments of the invention.

As shown in block 503, method 500 may further include molding the optical lens with the laminate conformed to the inner surface of a mold via injection molding to produce the optical lens with the laminate formed on the surface thereof. In some embodiments, as shown in FIG. 7, injection molding may include loading the thermoformed laminate wafer to a front inner surface of a mold for the optical lens. The mold may be then closed. A molten clear polycarbonate may be injected in the mold through an inlet to fuse bond the thermoformed laminate wafer with the molten clear polycarbonate. In some aspects, the injection pressure may be in a range of 50 to 1500 bar and all ranges and values there between. The molten clear polycarbonate may be at a temperature in a range of 200 to 320° C. and all ranges and values there between. The molding duration may be in a range of 0.5 to 10 minutes and all ranges and values therebetween including 0.5 to 1.0 minute, 1.0 to 1.5 minutes, 1.5 to 2.0 minutes, 2.0 to 2.5 minutes, 2.5 to 3.0 minutes, 3.0 to 3.5 minutes, 3.5 to 4.0 minutes, 4.0 to 4.5 minutes, 4.5 to 5.0 minutes, 5.0 to 5.5 minutes, 5.5 to 6.0 minutes, 6.0 to 6.5 minutes, 6.5 to 7.0 minutes, 7.0 to 7.5 minutes, 7.5 to 8.0 minutes, 8.0 to 8.5 minutes, 8.5 to 9.0 minutes, 9.0 to 9.5 minutes, and 9.5 to 10.0 minutes. The molten clear polycarbonate may be cooled after the molding to produce the optical lens with the laminate formed on a front surface thereof.

As part of the disclosure of the present invention, specific examples are included below. The examples are for illustrative purposes only and are not intended to limit the invention. Those of ordinary skill in the art will readily recognize parameters that can be changed or modified to yield essentially the same results.

Example 1

Optical Defects in the Polymeric Laminate that Includes a Functional Film

Two laminates were processed through free-edge vacuum thermoforming and injection molding. Each of the laminates included a polycarbonate film laminated on each side of a multi-layered optical film. The first laminate includes a pressure sensitive adhesive (Adhesive A) supplied by 3M® (United States). The second laminate includes a polyurethane adhesive (Adhesive B) containing polycaprolactone and polyisocyanate at a mass ratio of 1:3. The resulted laminates after the thermoforming and/or the injection molding processes were observed under microscope.

As shown in FIGS. 4A and 4B, the laminate that used Adhesive A exhibited wrinkles radiating from the center and from the edge. The cross-sectional view (FIG. 4B) reveals that the adhesive was unable to hold the shape of the functional layer when exposed to the stress propagating from the concave optical film (polycarbonate) side during thermoforming, resulting in the wrinkles shown in FIG. 4A. As shown in FIGS. 4C and 4D, the laminate that used Adhesive A exhibited irregular spots on the edge thereof. The cross-sectional view (FIG. 4D) shows that the adhesive was squeezed out from the edge of the laminate due to the high pressure applied to the laminate at an elevated temperature during the injection molding process, resulting in the irregular spots around the edge of the laminate shown in FIG. 4C. As shown in FIGS. 4E and 4F, the laminate that used Adhesive A exhibited wrinkles thereon after the injection molding process. The cross-sectional view (FIG. 4F) indicates that the high pressure applied to the laminate during the injection molding process disrupted the shaped of the functional film due to weak thermomechanical properties of Adhesive A at the molding temperature. The laminate that includes Adhesive B shows substantially no defects or much lower defect rate than the laminate that used Adhesive A.

Example 2

Analysis of Modulus by Compression for Adhesives Coated Polycarbonate Film

Figure 8:
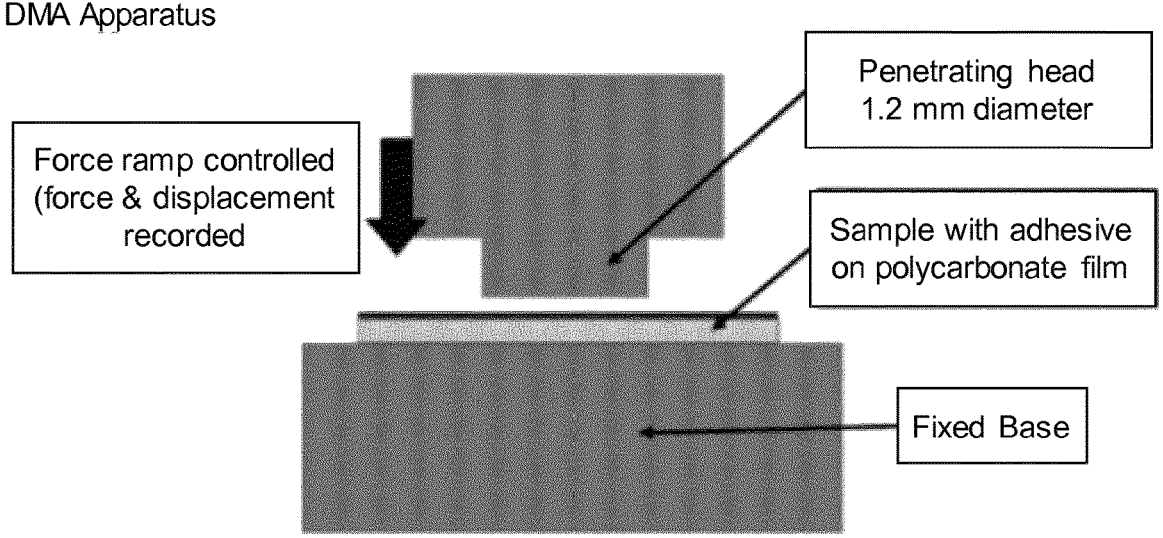
FIG. 8 shows a schematic diagram for an apparatus for Dynamic Mechanic Analysis.

A Dynamic Mechanical Analyzer was used to analyze the stress/strain response of the Adhesive A and Adhesive B of Example 1. As shown in FIG. 8, a sample adhesive coated on a polycarbonate film was loaded on a fixed base. The penetration head of the Dynamic Mechanical Analyzer was used to apply force to the adhesive coated on the polycarbonate film. The Dynamic Mechanical Analyzer was placed in a temperature controlled chamber and was configured to perform the following steps: Step 1: set a preload force of 0.000 Newtons (N); Step 2: Equilibrate to test temperature; Step 3: Hold temperature for 10 minutes; Step 4: Ramp force at 1.0 N/min to 18 N.

Four samples were analyzed. Sample (1) included polycarbonate film at 250 µm as the reference, which was the same polycarbonate film used in the laminates of Example 1 and samples (2) to (4) listed next. Sample (2) included a polycarbonate film coated with Adhesive A having an adhesive thickness of 37 µm, which was the same thickness used for the laminate sample. Sample (3) included a polycarbonate film coated with Adhesive B having an adhesive thickness of 8 µm, which was the same thickness used for the laminate sample. Sample (4) included a polycarbonate film coated with Adhesive B having an adhesive thickness of 205 µm, which was at a much higher thickness to further validate the results.

Figure 9A:
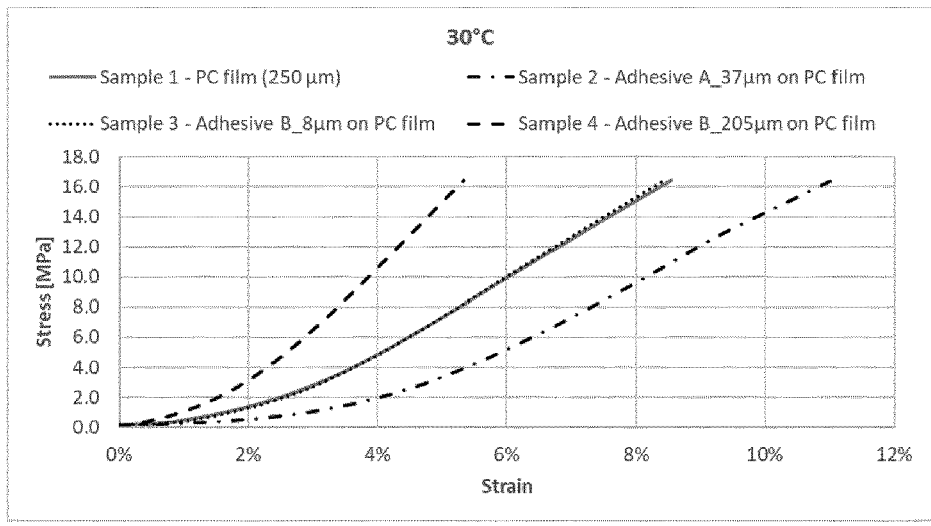
FIGS. 9A-9C show correlations between stress and percent strain for Adhesive A and Adhesive B coated polycarbonate film samples under temperatures of 30° C., 80° C., and 130° C.
Figure 9B:
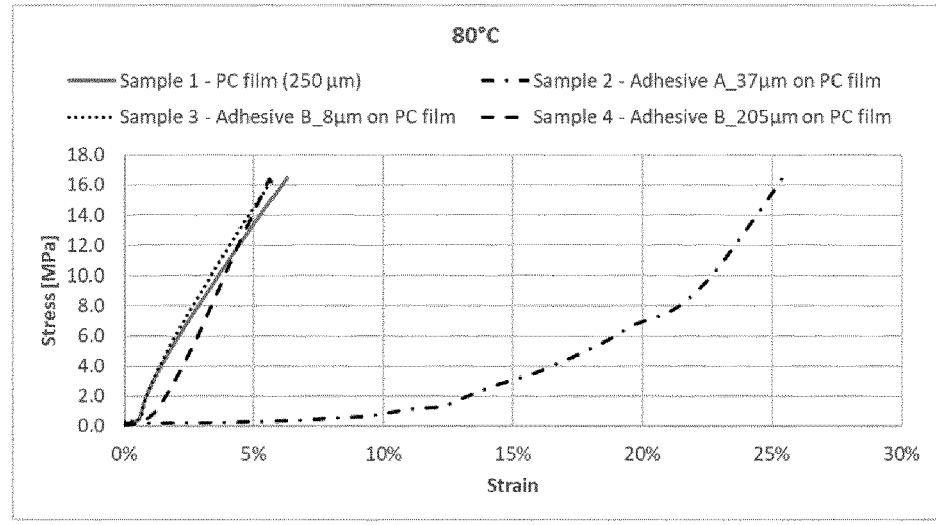
Figure 9C:
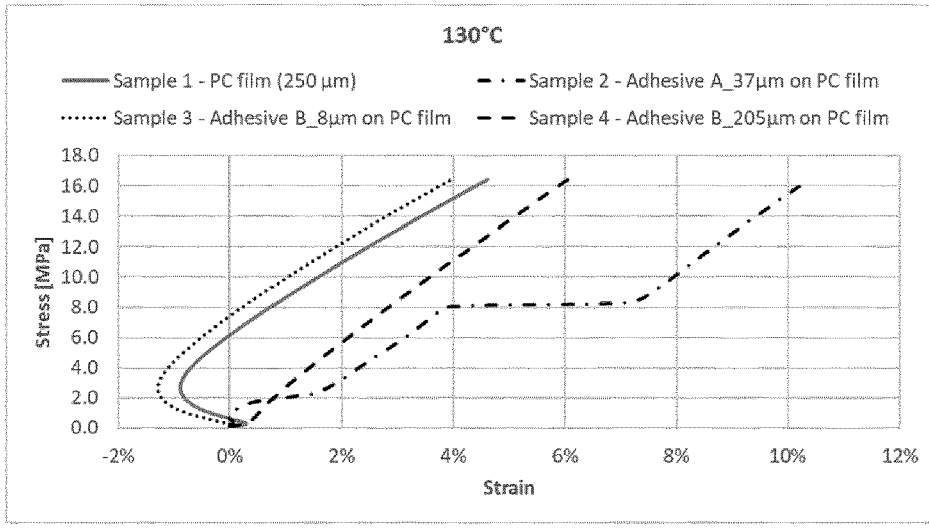

FIGS. 9A-9C show the results of the stress as a function of percent strain for all four samples. FIG. 9A is for the 30° C. test condition, 9B for 80° C. and 9C for 130° C. Linear regression of this data was used to compute the modulus. With the initial strain starting from the total thickness of the sample (PC film+adhesive). In most cases, the linear regression was performed on the linear section of the stress vs strain functions. For example, the initial part of the curves in FIGS. 9A-9C are not linear for certain reasons such as the penetrating head's cross-sectional area not fully in contact with the sample or when the sample deforms slightly and does not lay perfectly flat. These non-linear sections were ignored for the modulus calculation.

Examination of these results show that adhesive A has a significant negative impact to the samples modulus especially at higher temperatures. This indicates that Adhesive A can be squeezed out at the edge of the laminate at a similar condition that would be expected for the behavior of a liquid like material. Furthermore, the results show that Adhesive A was not able to withstand the compressive forces imparted on the concave polycarbonate layer during the free-edge vacuum thermoforming. The results in Table 1 show that the modulus for Adhesive B samples is significantly higher than Adhesive A at increased temperatures, indicating Adhesive B may be capable of preventing unwanted deformation and/or delamination of the adhesive and/or the functional film in the laminate during the thermoforming and injection molding processes.

TABLE 1

| Calculated Modulus by Compression (Pa) | | | |
| --- | --- | --- | --- |
| Sample | 30° C. | 80° C. | 130° C. |
| 1 PC Film (250 µm) | $2.6 \times 10^8$ | $2.5 \times 10^8$ | $2.1 \times 10^8$ |
| 2 Adhesive A (37 µm) on PC Film (250 µm) | $2.3 \times 10^8$ | $4.8 \times 10^7$ | $5.7 \times 10^6$ |
| 3 Adhesive B (8 µm) on PC Film (250 µm) | $2.7 \times 10^8$ | $2.7 \times 10^8$ | $2.2 \times 10^8$ |
| 4 Adhesive B (205 µm) on PC Film (250 µm) | $4.3 \times 10^8$ | $3.7 \times 10^8$ | $2.6 \times 10^8$ |

Example 3

Soft UV Curable Adhesive for Polycarbonate-Multi-Layered Optical Film Laminate

A laminate was prepared with a polycarbonate film laminated on each side of a multi-layered optical film using a UV curable adhesive. The UV curable adhesive was designed for good adhesion to both polycarbonate and polyethylene terephthalate surfaces. After lamination, the laminate showed a peel force above 20 N/inch. The laminate was then thermoformed by LEMA® machine (LEMA® CPL32 Automatic Bending Machine, LEMA of Pharma, Italy) at 150° C. for 5 minutes. Delamination was observed between the polycarbonate film and the multi-layered optical film. Since this adhesive was based on a soft and not crosslinked acrylic chemistry, the adhesion level reduced at elevated temperature due to its lower modulus response compared to Adhesive B described in Example 1.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods, and/or steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method of preparing a laminate that is incorporable on a surface of an optical lens, the method comprising:
   providing a functional film comprising a front surface and a back surface; and
   laminating an optical film on each of the front surface and the back surface of the functional film using an adhesive to form the laminate,
   wherein at a temperature from about 130° C. to 150° C., the optical film coated with the adhesive has a modulus by compression greater than $6 \times 10^6$ Pa at strains less than 100% at all temperatures in between 130° C. to 150° C., and
   wherein said compression modulus is determined by using a dynamic mechanical analyzer having a penetration head used to apply force to the optical film coated with the adhesive, said dynamic mechanical analyzer being disposed in a temperature controlled chamber and being configured to:
   1) set a preload force of 0.000 Newtons,
   2) equilibrate to test temperature after setting the preload force,
   3) hold the temperature for 10 minutes, and
   4) ramp force at 1.0 N/min to 18 N.

2. The method of claim 1, wherein the functional film comprises one of more of a multi-layered optical film, a polarized film, and a photochromic film, and
   the optical film comprises one or more of polycarbonate, cellulose triacetate, poly methyl methacrylate, polystyrene, polystyrene maleic anhydride, polyamide, thermoplastic urethane, polyester, copolyesters, polysulfone, cyclic olefin, and polyphenyl oxide.

3. The method of claim 2, wherein the multi-layered optical film comprises a high refractive index material including one or more of polycarbonate, polyester, polystyrene, polystyrene maleic anhydride, aromatic polyamide, aromatic thermoplastic urethane, polysulfone, polyphenyl oxide, and a low refractive index material including one or more of polymethyl methacrylate, aliphatic polyamide, aliphatic thermoplastic urethane, and cyclic olefin.

4. The method of claim 1, wherein the adhesive is configured to substantially avoid one or more of unwanted deformation and unwanted delamination of one or more of the functional film and the adhesive during one or more of a thermoforming process and an injection-molding process.

5. The method of claim 4, wherein the one or more of the unwanted deformation and the unwanted delamination of the one or more of the functional film and the adhesive causes optical defects on the surface of the optical lens when the laminate is incorporated on the surface of the optical lens.

6. The method of claim 1, wherein the adhesive comprises one or more of a polyurethane adhesive, an epoxy adhesive, a hot-melt adhesive, a hot-melt polyurethane reactive adhesive, and a crosslinked acrylic adhesive.

7. The method of claim 6, wherein the polyurethane adhesive comprises polycaprolactone to polyisocyanate at a mass ratio in a range of 0.1 to 1.0.

8. The method of claim 1, wherein the adhesive between the optical film and the functional film has a thickness of 0.5 to 20 μm.

9. The method of claim 1, wherein the optical lens comprises one or more of polycarbonate, poly methyl methacrylate, polystyrene, polystyrene maleic anhydride, polyamide, thermoplastic urethane, polyester, copolyesters, polysulfone, cyclic olefin, and polyphenyl oxide.

10. A laminate incorporable on a surface of an optical lens, the laminate comprising:
    a functional film comprising a front surface and a back surface; and
    an optical film laminated on each of the front surface and the back surface of the functional film via an adhesive,
    wherein the adhesive is configured to substantially prevent unwanted deformation of the functional film during one or more of a thermoforming process and an injection-molding process,
    wherein the optical film coated with the adhesive has a modulus by compression greater than $6 \times 10^6$ Pa at strains less than 100% at all temperatures in between 130° C. to 150° C., and
    wherein said compression modulus is determined by using a dynamic mechanical analyzer having a penetration head used to apply force to the optical film coated with the adhesive, said dynamic mechanical analyzer being disposed in a temperature controlled chamber and being configured to:
    1) set a preload force of 0.000 Newtons,
    2) equilibrate to test temperature after setting the preload force,
    3) hold the temperature for 10 minutes, and
    4) ramp force at 1.0 N/min to 18 N.

11. The laminate of claim 10, wherein the functional film comprises one or more of a multi-layered optical film, a polarized film, and a photochromic film, and
    the optical film comprises one or more of polycarbonate, poly methyl methacrylate, polystyrene, polystyrene maleic anhydride, polyamide, thermoplastic urethane, polyester, copolyesters, polysulfone, cyclic olefin, and polyphenyl oxide.

12. The laminate of claim 10, wherein, at a temperature from 130 to 150° C., said optical film coated with the adhesive has a modulus by compression greater than $6 \times 10^6$ Pa at strains less than 100% and greater than about $2 \times 10^8$ Pa at all temperatures in between 130° C. to 150° C.

13. A method of incorporating a functional film on a surface of an optical lens, the method comprising:
- preparing the laminate according to the method of claim 1;
- thermoforming the laminate according to an inner surface of a mold of the optical lens; and
- molding the optical lens with the laminate conformed to the inner surface of the mold via injection molding to produce the optical lens with the laminate formed on the surface thereof,
- wherein the laminate is configured to substantially avoid optical defects on the surface of the optical lens caused by unwanted deformation of the functional film during one or more of a thermoforming process and an injection-molding process.

14. The method of claim 13, wherein the thermoforming comprises one or more of free-edge vacuum thermoforming, vacuum with plug assist thermoforming, mold press thermoforming, and blow thermoforming.

15. The method of claim 13, wherein the thermoforming is carried out at a temperature of 100 to 150° C. and a pressure of −8 to 0.8 bar, and the injection-molding is carried out at a temperature of 200 to 320° C. and a pressure of 50 to 1500 bar.

16. The method of claim 1, wherein the optical film coated with the adhesive has a compression modulus greater than $2\times10^8$ Pa at strains less than 100% at all temperatures in between 130° C. to 150° C.

* * * * *